US006598031B1

United States Patent
Ice

(10) Patent No.: US 6,598,031 B1
(45) Date of Patent: Jul. 22, 2003

(54) APPARATUS AND METHOD FOR ROUTING ENCRYPTED TRANSACTION CARD IDENTIFYING DATA THROUGH A PUBLIC TELEPHONE NETWORK

(75) Inventor: Jeffrey L. Ice, Loxahatchee, FL (US)

(73) Assignee: EDI Secure LLLP, Orlando, FL (US)

( * ) Notice: Subject to any disclaimer, the term of this patent is extended or adjusted under 35 U.S.C. 154(b) by 535 days.

(21) Appl. No.: 09/628,533

(22) Filed: Jul. 31, 2000

(51) Int. Cl.$^7$ .............................................. G06F 17/00
(52) U.S. Cl. ............................ 705/50; 705/64; 705/77
(58) Field of Search ............................. 705/77, 50, 64, 705/67, 80; 380/239, 240; 713/200, 160, 201, 162; 709/229

(56) References Cited

U.S. PATENT DOCUMENTS

| | | | | |
|---|---|---|---|---|
| 4,614,861 A | * | 9/1986 | Pavlov et al. | 235/380 |
| 4,906,828 A | * | 3/1990 | Halpern | 235/379 |
| 5,519,569 A | * | 5/1996 | Sellers | 361/680 |
| 5,815,577 A | * | 9/1998 | Clark | 380/52 |

FOREIGN PATENT DOCUMENTS

JP    404266159 A  *  9/1992

OTHER PUBLICATIONS

Plastic With A Brain, v68n4, May 1994.*

* cited by examiner

Primary Examiner—Pierre E. Elisca
(74) Attorney, Agent, or Firm—Herbert Dubno

(57) ABSTRACT

A personal computer transmits encrypted information identifying a transaction card, together with a serial number of an encryption unit in which the information way encrypted, over a public network to a payment server. The payment server generates a single-use credit card number, which is returned to the personal computer over the public network, and stores the single-use credit card number together with the serial number and the encrypted information. The personal computer then transmits the single-use credit card number to a merchant's server through which a transaction is to be made. The single-use credit card number is transmitted to the payment server, which is identified according to a portion of the single-use credit card number. The payment server then decodes a portion of the encoded information according to a cryptogram located within a data base according to the serial number stored with the single-use credit card number. The payment server then transmits decoded information allowing the transaction to proceed.

33 Claims, 1 Drawing Sheet

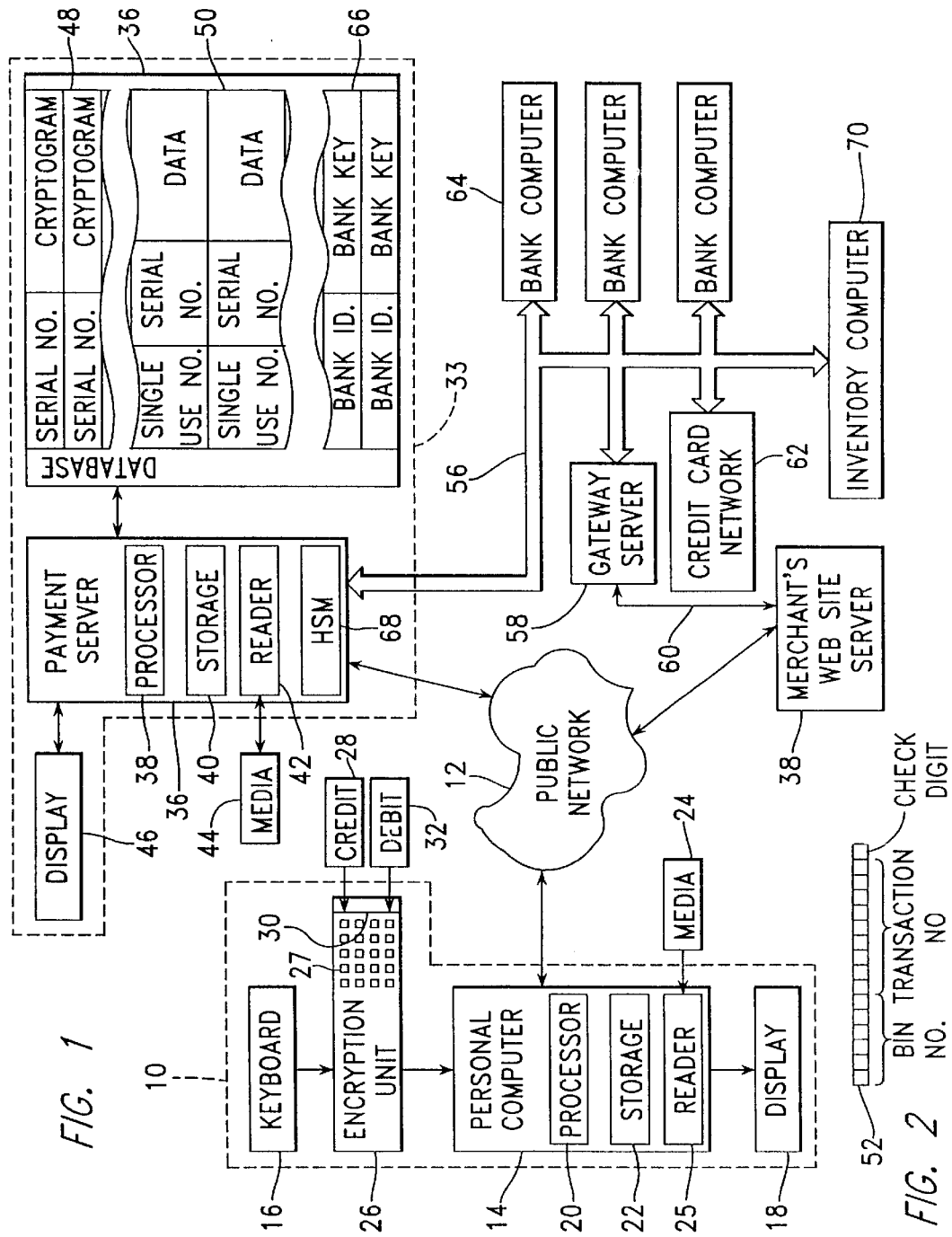

APPARATUS AND METHOD FOR ROUTING ENCRYPTED TRANSACTION CARD IDENTIFYING DATA THROUGH A PUBLIC TELEPHONE NETWORK

BACKGROUND INFORMATION

1. Field of Invention

This invention relates to an apparatus and method for routing confidential information through a public telephone network, and, more particularly, to an apparatus and method for sending encrypted credit card and debit card information through the Internet.

2. Description of the Related Art

U.S. Pat. Nos. 5,519,569 and 5,815,577 describe an encryption module for encrypting financial and other selective data, in the form of a unit which may be conveniently interposed in series between a personal computer and the keyboard associated therewith. An application program designated to run on the personal computer is configured to prompt the user to enter his PIN (Personal Identification Number) or other confidential data into the encryption module; consequently the confidential data need not be transmitted in an unencrypted fashion, and need not reside on the hard drive within the personal computer in an unencrypted form.

SUMMARY OF THE INVENTION

It is a first objective of the invention to provide a way for transmitting data identifying a transaction card, such as a credit card or a debit card, over a public network, such as the Internet in an encrypted form.

It is a second objective of the invention to provide a way for processing encrypted data transmitted over a public network so that the data can be decoded and used within a transaction card processing network not having a capability to handle elongated encrypted information.

It is a third objective of the invention to process certain encrypted data in a manner not recording decoded data within a computing system.

According to a first aspect of the invention, there is provided a method for decoding an encrypted transaction card identifying number, which is, for example, a credit card number or a debit card number, transmitted from a first computing system across a public network and for transmitting the transaction card identifying number to a second computing system, wherein the transaction card identifying number is encrypted within an encryption unit identified by a serial number, and wherein the method comprises steps of:

(a) receiving the encrypted transaction card identifying number and the serial number from the public network;

(b) generating a single-use number;

(c) storing the single-use number, the serial number, and the encrypted transaction card identifying number in a first data structure, wherein the serial number and the encrypted transaction card identifying number are found by locating the single-use number;

(d) receiving a second number;

(e) determining if the second number is stored within the first data structure as a single-use number;

(f) when the second number is determined to be stored within the first data structure as a single-use number, finding a cryptogram in a second data structure, wherein the cryptogram is found by locating a serial number in the second data structure equal to the serial number in the first data structure found by locating the single-use number in the first data structure;

(g) decoding a first portion of the encrypted transaction card identifying information with the cryptogram to generate a transaction card identifying number; and (h) transmitting the transaction card identifying number to the second computing system.

According to a second aspect of the present invention, apparatus is provided for sending an encrypted transaction card identifying number across a public network. The apparatus includes first, and second computing systems connected to the public network, processors within the first and second computing systems, a third computing system connected to communicate with the second computing system, and a data base accessed by the second computing system. The first computing system includes an encryption unit, identified by a serial number, for encrypting the transaction card identifying number. The processor within the first computing system executes a program for transmitting the serial number of the encryption unit with the encrypted transaction card identifying number along the public network.

The data base stores first and second data structures. The first data structure includes a first plurality of single-use credit card numbers, a serial number of an encryption unit associated with each single-use credit card number in the first plurality of single-use credit card numbers and found by locating the single-use credit card number in the plurality of single-use credit card number, and an encrypted transaction card identifying number transmitted with each single-use credit card number in the plurality of single-use credit card numbers. The second data structure, includes a second plurality of serial numbers identifying encryption units and a cryptogram associated with each serial number in the second plurality of serial numbers. The cryptogram, which is found by locating the serial number in the second plurality of serial numbers, decodes data encoded by an encryption unit identified by the serial number in the second plurality of serial numbers.

The processor within the second computing system executes a program including a first routine for receiving from the public network the serial number of the encryption unit with the encrypted transaction card identifying number from the public network, for calculating a single-use credit card number, and for storing the single-use credit card number with serial number of the encryption unit and the encrypted transaction card identifying number from the public network in the first data structure, and a second routine for receiving the single-use credit card number from the third computing system, for locating the single-use credit card number within the first data structure, for locating a serial number within the second data structure identical to a serial number found in the first data structure by locating the single-use credit card number therein, for decoding the encrypted transaction card number with a cryptogram found by locating the serial number within the second data structure to generate the transaction card number, and for transmitting the transaction card number.

Preferably the second routine additionally determines whether the transaction card number is a credit card number or a debit card number, and the data base additionally includes a third data structure including a third plurality of bank-identifying numbers and a bank key, associated with each bank-identifying number in the plurality of bank-identifying numbers, found by locating the bank-identifying number, and encoding information in a manner readable by a bank computer reached by the bank-identifying number. If the second routine determines that the transaction card number is a debit card number, the second routine additionally causes a PIN block portion of the encrypted transaction card identifying number to be re-encoded using the bank-key found by locating, within the third data structure, a bank-identifying number forming a portion of the transaction card number.

BRIEF DESCRIPTION OF THE FIGURES

FIG. 1 is a block diagram of apparatus for routing encrypted credit card and debit card data through a public telephone network; and FIG. 2 is a pictographic view of a single-use credit card number generated and transmitted within the apparatus of FIG. 1.

DESCRIPTION OF THE INVENTION

FIG. 1 is a block diagram of apparatus for routing encrypted credit card and debit card data through a public telephone network. This apparatus includes a personal computer terminal, generally indicated as 10, which is connected by conventional means to a public network 12, such as the Internet, operating over a public switched telephone network. The personal computer terminal 10 includes a personal computer 14, a keyboard 16, a display unit 18, all of which may be conventional devices. The personal computer 14 includes a processor 20 and a storage device 22, which is used to store data and to store instructions forming a program executing in the processor 20. Data and program instruction inputs may be made the keyboard 10, through computer readable media 24, which is read when inserted within a media reader 25, or through the connection to the public network 12.

The personal computer terminal 10 is also particularly configured to facilitate the generation and transmission of encrypted information, facilitating the use of the terminal 10 to purchase products and services and to direct bank transactions over the public network 12, while consistently maintaining a high level of security. To this end, the personal computer terminal 10 also includes an encryption unit 26, which may be of a type described in either or both U.S. Pat. Nos. 5,517,569 and 5,815,577. When the personal computer terminal 10 is used to purchase goods and services over the public network 12, a program controlling this process is preferably executing within the processor 20. This encryption unit 26 preferably includes a keypad 27 and a magnetic stripe reader 30. When, for example, the user of the computer terminal 10 wishes to purchase a product or service over the public network 12, he swipes a credit card 28 through a slot for reading by the magnetic stripe reader 30 in the encryption unit 26, which reads the magnetically encoded information on the card. When the user of the computer terminal 10 alternately wishes to purchase a product or service over the public network 12 using a debit card 32, he swipes the debit card 32 through the slot 30 in the encryption unit 26. For use with a debit card 32, the user then types in his PIN (Personal Identification Number) using a keypad 34 of the encryption unit 26. Many bank cards can be used either as a debit card or as a credit card. Preferably, the user can indicate, by means of a pointing device to move the cursor on the screen of the display unit 18, whether he wants his bank card to operate as a credit card or as a debit card.

Within the encryption unit 26, the data read from a magnetic stripe on the credit card 28 is encrypted into a form which cannot be read without a cryptographic key associated with the particular encryption unit 26. However, this process generates encrypted data which is much longer than the original data read from the credit card. Specifically, while each credit card is identified by an unencrypted 16-digit number, the encrypted version of this number is 48 characters long. Furthermore, while a debit card is identified by an unencrypted 16-digit number, together with the PIN number, the encrypted version of this number is 64 characters long, including a 16-character PIN block describing the PIN number in an encoded form. These significantly longer encoded data streams cannot be directly used with the various conventional systems configured to accept credit card or debit card information, since such systems are capable of dealing only with 16-digit numbers to identify accounts.

Within the apparatus of FIG. 1, the relatively long encoded data streams identifying accounts are routed through the public network 12 to a transaction terminal 33, which is particularly configured to accept and log these 48-character and 64-character data streams. Preferably, software executing within the personal computer 14 automatically initiates the contact made with the transaction terminal 34 and the transmission of the data in an encrypted form, after the data is provided by the user, or after an indication by the user that the data should be transmitted. At this point, the data transferred from the personal computer 14 the payment server 34 includes both encrypted information identifying the credit card number and unencrypted information specifying the serial number of the encryption unit 26 and the address to which the transaction is to be billed.

The transaction terminal 33 includes a payment server 34, which is also particularly configured to decode these data streams as they are transmitted through the public network 12 from the personal computer 14, since the payment server 34 has access to a cryptogram which can be used to decode encrypted data generated within the encryption unit 26, with cryptograms for a number of individual encryption units 26 being stored in a database 36 accessed by the payment server 34. The payment server 34 includes a processor 38, storage 40 holding instructions for a program executing within the processor 38, and a reader 42 for reading computer readable media 44 inserted within the reader 42. For example, the reader 42 may be a floppy disk reader for reading floppy magnetic disks. The media 44 stores, for example, a program used to facilitate secure financial transactions over the public network 12. Such a program may also be stored in magnetic media, such as a hardfile. The transaction terminal 33 also includes a display device 46 operating with the payment server 34.

The database 36 stores a data structure 48 including a number of cryptograms, each of which is stored in association with the serial number of the particular encryption unit 26 in which data decoded by the cryptogram is generated. The payment server 34 then generates a single-use credit card number, which is stored in a data structure 50 within the database 36, along with the data received from the personal computer 14. This data received from the personal computer 14 includes both the serial number of the encryption unit 26, unencrypted data including the billing address, and the encrypted data representing the credit card number. The single-use credit card number is also returned to the personal computer 14 over the public network 12.

FIG. 2 is a pictographic view of the 16-digit single-use credit card number 52. The first six digits are an ISO BIN number identifying the payment server 34. The following nine-digits are a transaction number assigned by the payment server 34. The final digit is a checksum digit.

Referring again to FIG. 1, after the personal computer 14 receives the single-use credit card number, this number is placed in window of the browser program executing within the personal computer 14 where the credit card number would otherwise be placed. While the single-use credit card number 52 is preferably handled within the personal computer 14 by software executing in the processor 20, the new number may alternately be displayed for the user to type as part of his order. Next, the order is transferred over the public network 12 to a web site server 54 operated by the merchant from which the goods or service is being ordered. The order is placed using the single-use credit card number 52 received from the payment server 34, along with other data identifying the object to be purchased, etc., by transmission over the public network 12 between the personal computer 14 and the merchant's web site server 54.

Various terminals and systems organizations handling of financial transactions are connected to a private network 56, which is often called a VAN (Value Added Network), and which is conventionally used for transactions among financial institutions. This is a secure network over which confidential information, such as credit card numbers and account numbers, is conventionally sent in an unencrypted manner. On the other hand, PIN numbers are conventionally encrypted for transmission over the private network 56. The private network 56 may be a series of interconnected networks used for transmission of financial data among institutions. As shown in FIG. 1, the payment server 34 and the merchant's web site server 54 are both connected to the private network 40, along with a gateway server 58 which is conventionally used for processing credit cards.

After the merchant's web site server 54 receives the single-use credit card number 37 from the personal computer 14, the web server 54 transmits this number to the gateway server 42, in a manner conventionally used for processing credit card orders. Typically, communication between the merchant's web site server 54 and the gateway server 58 occurs over a separate line 60, which may be provided through the public switched telephone network. Alternately, the merchant's web site server 54 may be connected to the private network 56, with information being transmitted between the web site server 54 and the gateway server 58 over this network 56. In either case, the gateway server 58 recognizes the first six digits of the single-use credit card number 54 as identifying the payment server 34. Therefore, the gateway server 58 then transmits the single-use credit card number 37 to the payment server 34. Next, the payment server 34 compares the single-use credit card number 52 with data stored within its database 36 in data structure 50. When a match is found, the payment server reads the serial number associated with the single-use credit card number in the data structure 50, and searches the data structure 48 for this serial number. When this serial number is found in the data structure 48, the payment server 34 uses the cryptogram associated with the serial number in the data structure 48 to decode the encrypted data associated with the single-use credit card number in the data structure. This decoded data is returned to the gateway server 58 which provided the single-use credit card number, providing the actual number of the credit card 28 in a conventional format.

The rest of the process occurs in a conventional way, for example with the gateway server 42 using the actual credit card number to contact a credit card network 62, which in turn contacts the bank computer 64, of the bank issuing the credit card 28, for approval of the transaction. Upon subsequent receipt of the approval the gateway server 58 provides an indication to the merchant's web site server 54 that the transaction has been approved. The gateway server conventionally also maintains account information for the merchant operating the web site server 54, with financial transactions being made over the private network 56 during the night. When the single-use credit card number 52 is accessed as described above to pay for a transition, a flag is set in the data structure 50 to indicate that the particular single-use credit card number 52 has been used for a purchase, and that it must not be used again. Therefore, anyone intercepting the single-use credit card number cannot use it for another purchase. On the other hand, the single-use credit card number, together with the serial number and the data accessed by the single-use credit card remain in the data structure 50. In the event that the customer decides to return an item purchased with the single-use credit card number 52, the merchant operating the web site server 38 can use this single-use credit card number to determine the details of the transaction, so that a refund can be conveniently arranged.

While the preceding discussion has dealt with a transaction initiated with the use of a credit card 28, it is understood that a transaction over the public network 12 can also be initiated with a debit card 32, or with a bank card that can be used either as a credit card or a debit card, depending on a determination made by the user and indicated by making a selection with a pointing device on material displayed on the screen of display unit 18. Whenever a debit card 32 is used, and whenever a bank card is used to provide a debit function, a PIN number must be provided by the user through the keypad 27 of the encryption unit 26. Within the encryption unit 26, this PIN number is encrypted, forming a PIN block for transmission, which increases the length of the encrypted data transmitted over the public network 12 from 48 to 64 digits.

When the payment server 34 receives information encrypted for a debit card 32, transmitted by the personal computer 14 over the public network 12, the encrypted information, including the PIN block, is stored in the data structure 50. The single-use credit card number, which is then generated to return to the personal computer 14 over the public network, does not identify the transaction as using a debit card 32; there is no reference, encrypted or otherwise, to the PIN number block. This single-use credit card number is also stored with the other data in the data structure 50.

Thus, when the merchant's web site server 54 receives the single-use credit card number, it forwards this number to the gateway server 58, which recognizing that the ISO BIN portion of the single-use credit card number identifies the payment server 34, forwards this data to the payment server 34, without having identified the data as being associated with a debit card 32. However, when the payment server 34 then finds the single-use credit card number in the data structure 50, it determines that the encrypted data is from a debit card 32, including a PIN block as well as data identifying the debit card number. The payment server 34 then decodes the information identifying the debit card number. The ISO BIN portion of this number is used to identify the bank issuing the debit card. In accordance with a preferred version of the present invention, the database 35 also includes a data structure 66 including a number of bank keys used to encode confidential information for transmission along the private network 56. Each of these bank keys is associated in the database 35 with a bank ID identifying the bank using the key, allowing the payment server 34 to determine the proper key to use to encode information for the bank otherwise identified by the ISO BIN portion of the debit card number.

The payment server 34 also includes a Hardware Security Module 68 (HSM), which is used to decode and re-encode the PIN module of the encrypted data without transmitting unencrypted PIN data outside the payment server 34 and without storing such data within the payment server 34. This is accomplished by driving unencrypted data only through circuits within the HSM 68. The processes of decoding and re-encoding are needed before PIN data can be transmitted to a bank computer 64 because the PIN module is stored within the database 60 in the form encrypted by the encryption unit 26. Since the bank computer 64 does not have the cryptogram of the encryption unit 26, it cannot determine the PIN data from this information. Therefore, the program executing within the processor 38 of the payment server 34 causes the cryptogram from data structure 48 associated with the serial number in turn associated with the single-use credit card number in data structure 50 to decode the PIN block within the HSM 68 and to re-encode the information according to the bank key associated with the bank ID in database 66. Next, this bank ID is used to route unencrypted data, including the debit card number, to the bank computer 64 of the bank identified by the bank ID.

Upon approval of the debit card transaction, the bank computer 64 returns an approval indication to the payment server 33. The payment server 33 then returns an approval indication to the gateway server 58, which in turn notifies the merchant's web site server 54.

According to a preferred version of the present invention, the payment server is also connected to an inventory computer 70 operated in association with the process of manufacturing the encryption units 26 and storing data associated with this manufacturing process. During the process of manufacturing each encryption unit 26, it is provided with a particular key, which is subsequently used to encrypt data. The serial number of each encryption unit 26 is transmitted, along with an associated cryptograph for decoding data encrypted by that particular unit 26, from the inventory computer 70 to the payment server 34. When the payment server 34 receives this information, it is appended to the data structure 48. This information may be sent as individual encryption units 26 are completed, or, preferably, in a block of information, describing a number of encryption units 26, which is transmitted over the private network 56 at a convenient time.

The methods in which data is developed and transmitted along the private network 56 varies, particularly as various of the entities having devices connected to this network 56 assume changing roles in the processing of credit cards and debit cards. For example, the gateway server 58 can establish an interface allowing it to process debit cards through the bank computers 64. In this event, the debit card information may be transmitted from the payment server 34 to the gateway server 58 instead of to the bank computer 64. Also, the bank computer 64 may be used to provide the functions of a credit card network 62, so that the gateway server 58 can contact the bank computer 64 directly.

While the invention has been described in its preferred form or embodiment with some degree of particularity, it is understood that this description has been given only by way of example, and that numerous changes in the details of system configuration and process steps may be made without departing from the spirit and scope of the invention.

What is claimed is:

1. A method for decoding an encrypted transaction card identifying number transmitted from a first computing system across a public network and for transmitting said transaction card identifying number to a second computing system, wherein said transaction card identifying number is encrypted within an encryption unit identified by a serial number, and wherein said method comprises steps of:

(a) receiving said encrypted transaction card identifying number and said serial number from said public network;

(b) generating a single-use number;

(c) storing said single-use number, said serial number, and said encrypted transaction card identifying number in a first data structure, wherein said serial number and said encrypted transaction card identifying number are found by locating said single-use number;

(d) receiving a number;

(e) second second number is stored within said first data structure as a single-use number;

(f) second second number is determined to be stored within said first data structure as said single-use number, finding a cryptogram in a second data structure; wherein said cryptogram is found by locating said serial number in said second data structure equal to said serial number in said first data structure found by locating said single-use number in said first data structure;

(g) decoding a first portion of said encrypted transaction card identifying information with said cryptogram to generate a transaction card identifying number; and (h) transmitting said transaction card identifying number to said second computing system.

2. The method of claim 1, wherein, preceding step (a), said method additionally comprises steps of:

(i) receiving said serial number and said cryptogram; and (j) storing said serial number and said cryptogram in said second data structure.

3. The method of claim 1, wherein said second computing system is identified to receive said transaction card identifying number in step (g) as a computing system from which said number is received in step (d).

4. The method of claim 3, wherein all of said encrypted transaction card identifying information is decoded within step (g).

5. The method of claim 1, wherein said second computing system is identified to receive said transaction card identifying number in step (g) by a part of said first portion of said transaction card identifying number.

6. The method of claim 5, wherein, following step (g), said method additionally comprises steps of:

(k) decoding a second portion of said encrypted transaction card identifying information with said cryptogram; and (l) re-encoding said second portion of said encrypted transaction card identifying information with a key.

7. The method of claim 6, wherein, between steps (g) and (k), said method additionally comprises a step of finding said key in a third data structure, wherein said key is found by locating a location identifying code matching said part of said first portion of said transaction card identifying information.

8. The method of claim 1, additionally comprising, after step (f), a step of setting a flag within said first data structure, wherein said flag prevents said single-use number from being used again in a purchase, and wherein said flag allows said single-use number to be used again to access data concerning an initial transaction.

9. The method of claim 1, additionally comprising steps of:

receiving said encrypted transaction card identifying number and said serial number from said first computing system within said second computing system;

generating said single-use number within said second computing system, wherein said single-use number includes said first portion identifying said second computing system;

storing said single-use number, said serial number, and said encrypted transaction card identifying number in a first data structure, within a data base accessed by said second computing system, wherein said serial number and said encrypted transaction card identifying number are found by locating said single-use number;

following step (c), receiving said single-use number from said first computing system;

identifying said second computing system by said first portion of said single-use number;

transmitting said single-use number to said second computing system;

within said second computing system, finding said cryptogram in said second data structure in said data base accessed by said second computing system, wherein said cryptogram is found by locating a serial number in said second data structure equal to said serial number in said first data structure found by locating said single-use number in said first data structure;

within said second computing system, decoding said first portion of said encrypted transaction card identifying information with said cryptogram to generate said transaction card identifying number; and transmitting said transaction card identifying number from said second computing system to a third computing system.

10. The method of claim 9, wherein transmitting said single-use number to a fourth computing system.

11. The method of claim 10, wherein said fourth computing system is said third computing system.

12. The method of claim 9, wherein, said method additionally comprises steps of:

receiving said serial number and said cryptogram within said second computing system; and storing said serial number and said cryptogram in said second data structure.

13. The method of claim 9, wherein said third computing system is identified to receive said transaction card identifying number as a computing system from which said number is transmitted.

14. The method of claim 9, wherein all of said encrypted transaction card identifying information is decoded.

15. The method of claim 9, wherein said third computing system is identified to receive said transaction card identifying number by a part of said first portion of said transaction card identifying number.

16. The method of claim 15, wherein, said method additionally comprises steps of:

decoding a second portion of said encrypted transaction card identifying information with said cryptogram; and re-encoding said second portion of said encrypted transaction card identifying information with a key.

17. The method of claim 16, wherein, said method additionally comprises a step of finding said key in a third data structure, wherein said key is found by locating a location identifying code matching said part of said first portion of said transaction card identifying information.

18. The method of claim 9, additionally comprising, a step of setting a flag within said first data structure, wherein said flag prevents said single-use number from being used again in a purchase, and wherein said flag allows said single-use number to be used again to access data concerning an initial transaction.

19. A computer readable medium having recorded thereon a computer program, wherein said computer program, when executed within a processor of a computer server, causes said computer server to perform a method for decoding an encrypted transaction card identifying number transmitted from a first computing system across a public network and for transmitting said transaction card identifying number to a second computing system, wherein said transaction card identifying number is encrypted within an encryption unit identified by a serial number, and wherein said method comprises steps of:

(a) receiving said encrypted transaction card identifying number and said serial number from said public network;

(b) generating a single-use number;

(c) storing said single-use number, said serial number, and said encrypted transaction card identifying number in a first data structure, wherein said serial number and said encrypted transaction card identifying number are found by locating said single-use number;

(d) receiving a number;

(e) determining if said number is stored within said first data structure as said single-use number;

(f) when said number is determined to be stored within said first data structure as said single-use number, finding a cryptogram in a second data structure, wherein said cryptogram is found by locating said serial number in said second data structure equal to said serial number in said first data structure found by locating said single-use number in said first data structure;

(g) decoding a first portion of said encrypted transaction card identifying information with said cryptogram to generate a transaction card identifying number; and (h) transmitting said transaction card identifying number to said second computing system.

20. The computer readable medium of claim 19, wherein, preceding step (a), said method additionally comprises steps of:

(i) receiving said serial number and said cryptogram; and (j) storing said serial number and said cryptogram in said second data structure.

21. The computer readable medium of claim 20, wherein said second computing system is identified to receive said transaction card identifying number in step (g) as a computing system from which said number is received in step (d).

22. The computer readable medium of claim 21, wherein all of said encrypted transaction card identifying information is decoded within step (g).

23. The computer readable medium of claim 19, wherein said second computing system is identified to receive said transaction card identifying number in step (g) by a part of said first portion of said transaction card identifying number.

24. The computer readable medium of claim 23, wherein, following step (g), said method additionally comprises steps of:

(k) decoding a second portion of said encrypted transaction card identifying information with said cryptogram; and (l) re-encoding said second portion of said encrypted transaction card identifying information with a key.

25. The computer readable medium of claim 24, wherein, between steps (g) and (k), said method additionally comprises a step of finding said key in a third data structure, wherein said key is found by locating a location identifying code matching said part of said first portion of said transaction card identifying information.

26. The computer readable medium of claim 19, additionally comprising, after step (f), a step of setting a flag within said first data structure, wherein said flag prevents said single-use number from being used again in a purchase, and wherein said flag allows said single-use number to be used again to access data concerning an initial transaction.

27. Apparatus for sending an encrypted transaction card identifying number across a public network, comprising:
- a first computing system connected to said public network, including an encryption unit, identified by a serial number, for encrypting said transaction card identifying number;
- a processor within said first computing system executing a program for transmitting said serial number of said encryption unit with said encrypted transaction card identifying number along said public network;
- a second computing system connected to said public network;
- a third computing system connected to communicate with said second computing system;
- a data base, accessed by said second computing system, storing a first data structure, including a first plurality of single-use credit card numbers, a serial number of said encryption unit associated with each single-use credit card number in said plurality of single-use credit card numbers and found by locating said single-use credit card number in said plurality of single-use credit card numbers, and an encrypted transaction card identifying number transmitted with each single-use credit card number in said plurality of single-use credit card numbers, and a second data structure, including a second plurality of serial numbers identifying encryption units and a cryptogram associated with each serial number in said second plurality of serial numbers, wherein said cryptogram is found by locating said serial number in said second plurality of serial numbers, and wherein said cryptogram decodes data encoded by said encryption unit identified by said serial number in said second plurality of serial numbers;
- a processor within said second computing system executing a program including a first routine for receiving from said public network said serial number of said encryption unit with said encrypted transaction card identifying number from said public network, for calculating said single-use credit card number, and for storing said single-use credit card number with serial number of said encryption unit and said encrypted transaction card identifying number from said public network in said first data structure, and a second routine for receiving said single-use credit card number from said third computing system, for locating said single-use credit card number within said first data structure, for locating said serial number within said second data structure identical to a serial number found in said first data structure by locating said single-use credit card number therein, for decoding said encrypted transaction card number with said cryptogram found by locating said serial number within said second data structure to generate said transaction card number, and for transmitting said transaction card number.

28. The apparatus of claim 27, wherein
said single-use credit card number includes a first portion identifying said second computing system; and
said third computing system transmits said single-use credit card number to said second computing system in accordance with said first portion.

29. The apparatus of claim 27, additionally comprising a fourth computing system receiving said single-use credit card number and transmitting said single-use credit card number to said third computing system.

30. The apparatus of claim 27, wherein said transaction card number is transmitted from said second computing system to said third computing system.

31. The apparatus of claim 27 wherein said transaction card number is transmitted from said second computing system to a computing system identified by a first portion of said transaction card number.

32. The apparatus of claim 27, wherein
said second routine additionally determines whether said transaction card number is a credit card number or a debit card number;
said data base additionally includes a third data structure including a third plurality of bank-identifying numbers and a bank key, associated with each bank-identifying number in said plurality of bank-identifying numbers, found by locating said bank-identifying number, and encoding information in a manner readable by a bank computer reached by said bank-identifying number; and
if said second routine determines that said transaction card number is said card number, said second routine additionally causes a PIN block portion of said encrypted transaction card identifying number to be re-encoded using said bank-key found by locating, within said third data structure, a bank-identifying number forming a portion of said transaction card number.

33. The apparatus of claim 27, wherein
said first data structure additionally includes a flag bit associated with said single-use credit card number;
said flag bit is set when said single-use credit card number is found to match said single-use credit card number received by said second computing system;
said flag bit when set prevents said single-use credit card number from being used for an additional purchase transaction; and
said flag bit when set allows said single-use credit card number to be used for processing a refund.

* * * * *

UNITED STATES PATENT AND TRADEMARK OFFICE
CERTIFICATE OF CORRECTION

PATENT NO. : 6,598,031 B1  
APPLICATION NO. : 09/628533  
DATED : July 22, 2003  
INVENTOR(S) : Jeffrey L. Ice Page 1 of 1

It is certified that error appears in the above-identified patent and that said Letters Patent is hereby corrected as shown below:

In the Claims

Column 8, Claim 1, line 15 should read: 1. (e) determining if said number is stored within said first data structure as a single-use number, Column 8, Claim 1, line 17 should read: 1. (f) when said number is determined to be stored within said first data structure as said single-use number, finding a cryptogram in a second data structure, wherein said cryptogram is found by locating said serial number in said second data structure equal to said serial number in said first data structure found by locating said single-use number in said first data structure;

Signed and Sealed this  
Fifteenth Day of September, 2015

Michelle K. Lee  
*Director of the United States Patent and Trademark Office*